Aug. 26, 1969          L. J. REHAG          3,463,364
DISPENSING CONTAINER COVER AND SPOUT ASSEMBLY
Filed Jan. 2, 1968
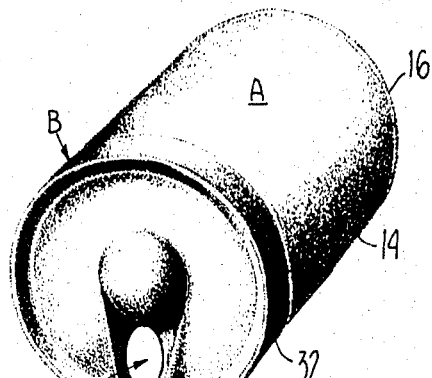
FIG_1
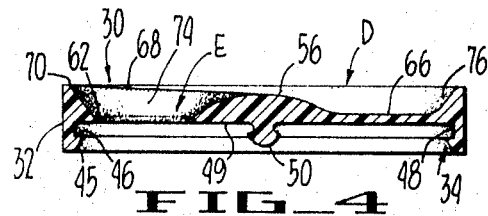
FIG_4
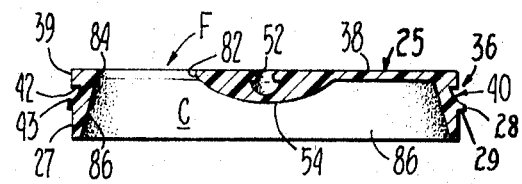
FIG_5
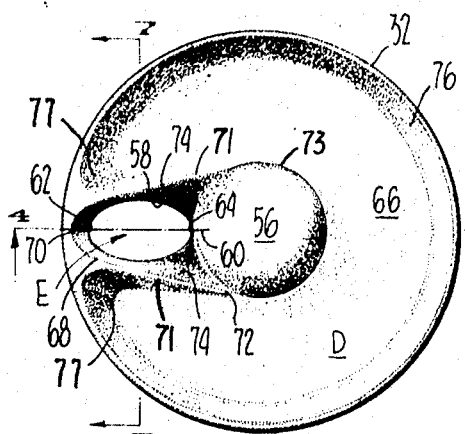
FIG_2
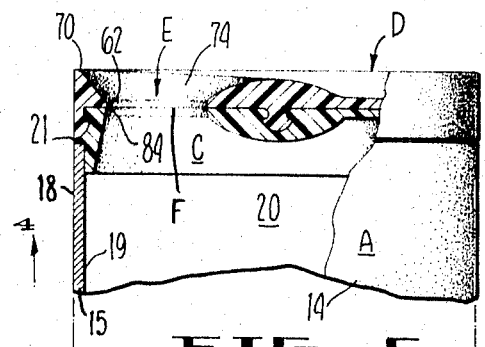
FIG_6
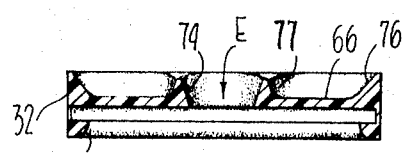
FIG_7
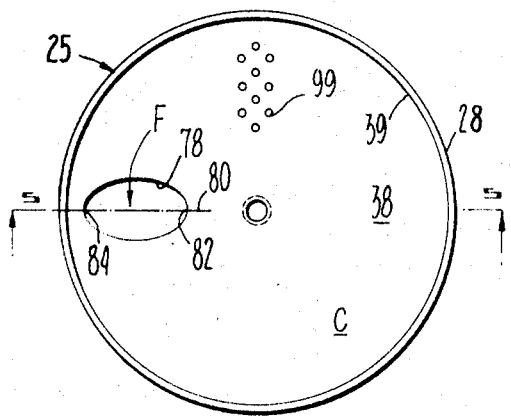
FIG_3
LAWRENCE J. REHAG
INVENTOR.
BY Townsend and Townsend
ATTORNEYS

United States Patent Office

3,463,364
Patented Aug. 26, 1969

3,463,364
DISPENSING CONTAINER COVER AND SPOUT ASSEMBLY
Lawrence J. Rehag, San Francisco, Calif., assignor to Logan, Carey and Rehag, San Francisco, Calif., a corporation of California
Filed Jan. 2, 1968, Ser. No. 695,250
Int. Cl. B65d 47/06
U.S. Cl. 222—480                    4 Claims

ABSTRACT OF THE DISCLOSURE

This invention relates to a cylindrical container cover which is formed with its peripheral edge coincident with the side wall of the cylinder of the container to provide a means whereof the cover can be rotated thereupon, in which the cover is deformed to form a spout for pouring of contents from the container.

---

This invention relates to container lids and more specifically discloses a container lid for dispensing the granular contents of a sealed container through a three-dimensional pouring spout.

Dispensing container lids are commonly affixed in sealing relation to the cylindrical and open end of a container. Such lids typically comprise the combination of a container cover immediately sealing the cylindrical end of the container and a cap attached thereto for sliding rotational movement over a surface of the cover. In these lids the container cover and rotating cap have corresponding apertures therein, which apertures can be rotated into and out of registry. As moved into registry the aligned apertures of the cover and top provide an exit through which the contents of the container can be poured. As moved out of registry, the nonaligned apertures of the cover and top are sealed.

Containers having dispensing lids of the type described have two major shortcomings. First, the apertures of the cover and top as registered do not define a pouring spout. As failing to define a pouring spout, the contents of the container are frequently poured in varied and random directions and therefore cannot be directed in a single unitary stream through the container lid.

Secondly, containers of the prior art having three-dimensional pouring spouts do not combine such spouts with a container cap having turning surfaces peripheral with the outside dimension of the container. Regarding such peripheral turning surfaces, frequently particles of the container contents or other extraneous substances work between the sliding surfaces of the container cover and rotatably mounted top. These particles often cause the sliding surfaces to adhere or bind with respect to one another, making turning of the top with respect to the cover extremely difficult. When such adherance or binding occurs, the absence of a peripheral turning surface coextensive with the outside dimension of the container provides insufficient leverage to free the sliding surfaces of the cap and container.

The present invention combines a rotating container top having a peripheral turning surface with a three-dimensional pouring spout. This disclosed container lid provides for both convenient rotation of the container top with respect to the cover overcoming adherance or binding, and a three-dimensional pouring spout through which the contents of the container may be poured in a single unitary and directable stream.

The lid includes a cover mounted in an immediate sealing relation across the open cylindrical end of a container. A top coextensive with the outside dimension of the cylindrical container is attached to the cover for sliding rotational movement thereon. This top is provided with a peripheral turning surface coextensive with and adjoined to the cylindrical end of the container. The top may be grasped at the peripheral turning surface by the finger tips and rotated into and out of positions of registry between its three-dimensional pouring spout and an underlying aperture in the cover. When registered by rotation of the top at its turning surface, the aligned aperture and three-dimensional pouring spout permits the container contents to be poured in a unitary stream therefrom; when moved out of registry by rotation of the container top at its turning surfaces, the nonaligned aperture and three-dimensional pouring spout are sealed.

The top of the disclosed dispensing lid has the advantage of being grasped along its peripheral surface to exert maximum leverage for rotating the cap with respect to the cover. Typically, the top is mounted concentric with and coextensively overlying the container cover. At the periphery thereof the top has a turning surface, which turning surface occupies a segment or fraction of the overall container length. Located at a position remote from the center of rotation of the top with respect to the cover, this turning surface permits the exertion of maximum leverage for rotating the cap and its pouring spout with respect to the complementary aperture of the cover.

Additionally, the disclosed dispensing lid has the three-dimensional pouring spout configured within the segment of the container occupied by the lid. This spout does not protrude outwardly and above the container top and thus permits the containers to be stacked one upon another.

The cover and top of the dispensing lids are provided with both central and peripheral fastenings, which fastenings permit compressive conjoinder of the cover and rotating top and maintain the cover and top thereafter in firm rotational interconnection. The cover and top are conjoined at their respective center of rotation by mating male and female snap members defined within the top and cover of the dispensing lid. Similarly, the cover and top are conjoined at their concentric peripheries by mating and interlocking flange members. As joined both centrally and peripherally, the sliding and sealing relation between the top and cover is at all times preserved.

Other objects, features and advantages of the present invention will be more apparent after referring to the following specification and accompanying drawings in which:

FIG. 1 is a perspective view showing a container having the dispensing lid of the present invention affixed thereto;

FIG. 2 is an expanded plan view of the container top illustrating specifically the three-dimensional pouring spout therein;

FIG. 3 is a plan view of the container cover having apertures for registry with the pouring spout of the top configured therein;

FIG. 4 is a side elevational section taken along the container top at lines 4—4 of FIG. 2;

FIG. 5 is a side elevational section of the container cover taken along lines 5—5 of FIG. 3;

FIG. 6 is a partial side elevation section taken concentrically of a conjoined container and dispensing lid, illustrating the three-dimensional pouring spout of the container top registered with the complementary aperture in the container cover; and, FIG. 7 is a side elevation of the dispensing spout in the container top taken along lines 7—7 of FIG. 2.

With reference to FIGURES 1 and 6, container A is shown having dispensing lid B sealing the end portion thereof. Dispensing lid B in turn comprises cover C immediately sealing the container end and top D slideable on and rotatably mounted to the cover. Top D has configured therein three-dimensional pouring spout E, which spout when registered with complementary aperture F in cover C defines a pouring aperture through dispensing lid B.

Container A is typically made from cardboard and comprises body 14 which body has cylindrical side walls 15 extending between dispensing lid B and container end 16. Side walls 15 are here shown having a circular cross-section with respect to the axis of the container, defining concentric outside container surface 18 and inside container surface 19. This body terminates in open container end 20 which end is immedately proximate top boundary 21 of cylindrical side walls 15 and is sealed by dispensing lid B.

Dispensing lid B immediately seals container A with cover C. Illustrated separately in FIGS. 3 and 5, cover C comprises polyethylene cover body 25 which body is circular in cross-section and fastens over open container end 20 at inside sleeve 27. Sleeve 27 has an outside diameter for slideable engagement along that segment of inside container surface 19 which immediately adjoins top boundary 21 of cylindrical side walls 15. Peripherally configured in cover C and defining the upward boundary of container fastening surface 27 there is an outwardly protruding and concentric ring 28 which adjoins along its lower ring surface 29, top boundary 21 of side walls 15. Container A and cover C are affixed typically by cementing sleeve 27 and thereafter compressing the container and cover together.

Cover C has attached thereon for sliding rotational movement a top D, which top is separately illustrated in FIGS. 2 and 4. Similar to cover C, top D comprises a polyethylene top body 30, which body is circular in cross section. Top body 30 has an outside turning surface 32 and fastens for sliding rotational movement over the outside of cover C.

Turning surface 32 of top D comprises a broad and circular cylindric surface defining a rim coextensive with the outside surface 18 of container A. This defined rim of turning surface 32 has a width which permits convenient grasping and turning of the top. This width comprises an appreciable segment of the overall container height and is sufficient for dispensing lid B to be grasped thereat by the finger tips. When the container is grasped in one hand and the top grasped at turning surface 32 in the other hand, sliding rotation of the top on the cover is effected with maximum leverage.

Regarding the sliding rotation of top D with respect to cover C, these members are conjoined both at the axis of rotation and at the periphery of rotation. At the axis of rotation the top and cover are joined by mating male snap member 50 of the cap and female snap member 52 of the cover; at the periphery of rotation the top and cover are joined by mating inside flange 34 of the cap and outside flange 36 of the cover.

Both the cover C and top D have expanded sections proximate their respective axially located snap members. Cover C has in the central portion thereof a dome-shaped enlargement 54, which enlargement extends downwardly from cover C into container A. Similarly, top D has a dome-shaped enlargement 56 which enlargement extends upwardly of the cover top opposite male snap member 50. These respective dome-shaped enlargements provide the material of the cover and top with an expanded section whereby the cover and top have sufficient strength and thickness to accommodate the snap members extending therebetween.

Top D rotates on cover C by sliding on surface 38 of the cover. This surface is flat, smooth, and circular in shape, and terminates at cover flange 36 along the periphery thereof.

Outside cover flange 36 at the top portion of cover C is the peripheral member about which top D rotates or turns. This flange has a circular cover flange edge 39 which edge is normal to surface 38 and defines the circular boundary thereof. Below edge 39 and extending inwardly therefrom is circular top flange receiving groove 40. Groove 40 comprises an inwardly extending boundary 42 and an arcuate flange receiving surface 43. Boundary 42 extends from flange edge 39 parallel to and below surface 38. Flange receiving surface 43 commences at the inward extremity of boundary 42 and curves from a downward slope normally from boundary 42 in a concave configuration outwardly towards a horizontal slope in the vicinity of container fastening ring 28. Both inside top flange 34 and top flange receiving groove 40 are symmetrically configured within the periphery of cover C so as to accommodate rotatably thereabout inside top flange 34.

Top D has attached thereto a complementary inside top flange 34 which flange fits about the periphery of outside cover flange 36 and interior of flange receiving groove 40. Flange 34 commences at the lower inside extremity of cover D at arcuate inside top flange surface 45. Top flange surface 45 is complemental to and fits adjoining flange receiving surface 43 when the top and cover are conjoined. This surface is convex in side elevation and extends from a horizontal slope adjoining the lower periphery of turning surface 32 to a vertical slope adjoining top flange inside boundary 46. Top flange boundary 46 extends from the innermost extremity of inside top flange 34 horizontally to inside flange surface 48. This boundary adjoins inwardly extending boundary 42 when top D is fastened rotatably to cover C. Similarly inside flange surface 48 adjoins edge 39 of cover C. Surface 48 extends normally upward from boundary 46 and terminates at lower surface 49 of top D. Similar to outside cover flange 36, inside top flange 34 is symmetrical and concentric about the inside portion of top D so as to affect rotatable attachment of the top D to the cover C.

Cover C and top D are conjoined so as to rotate along the respective snap members and flanges and slide at their respective surfaces 38 and 49. Such conjoinder is effected by compressing top D downwardly over cover C. As compressed snap members 50 and 52 conjoin the central portion of the top and cover; similarly, as compressed inside flange 34 extends over outside flange 36 to conjoin the periphery of the top and cover. As joined together the symmetry of the snap members and flanges permit top D to be rotated with respect to cover C so as to provide a method of selectively sealing spout E of top D and complementary aperture F of cover C.

Top D has contained therewithin a three-dimensional pouring spout E. Spout E has an elliptical periphery 58 at its inward extremity where it adjoins surface 49. This periphery has the major axis 60 of the elliptical aperture radially aligned on cover D. The elliptical periphery 58 of spout E has an outward vertex 62 proximate turning surface 32 and the remaining or inward vertex 64 adjoining the central portion of cover C where dome-shaped enlargement 56 protrudes from top body 30.

The upward periphery of spout E has a U-shaped or parabolic type boundary 68 which boundary has an axis coincident with and is symmetrical about major axis 60 of elliptical periphery 58. Similar to first vertex 62 of elliptical periphery 58, the vertex 70 of boundary 68 adjoins the turning surface 32 of top D and forms the outward extremity of the pouring spout E.

As can be seen from FIG. 4, parabolic boundary commences with its vertex 70 adjacent the upper extremity of turning surface 32 and slopes linearly inclined slightly from horizontal towards the medial portion of exposed dome-shaped enlargement 56 of top D. The parabolic boundary when viewed in plan diverges outwardly at its respective linear legs 71 terminating at points 72 where the legs 71 are proximately tangent to the circular boundary 73 of dome-shaped enlargement 56 at exposed surface 66 on top D.

Three-dimensional pouring spout E between parabolic boundary 68 and elliptical periphery 58 has tapering side walls 74. Side walls 74 as extending between the respective vertex 70 of the parabolic boundary 68 and vertex 62 of elliptically shaped periphery 58 are inclined so as to produce an angle of approximately 45 degrees. As adjoining the minor axis of the elliptically shaped periphery (shown as lines 7—7 in FIG. 2) tapering side walls 74 become more vertically sloped as illustrated in FIG. 7.

Along that segment of elliptical periphery 58 adjoining dome-shaped enlargement 56 spout E has a slope between parabolic boundary 68 and elliptical periphery 58 which adjoins the central portion of top D.

Extending about the periphery of spout E and dome-shaped enlargement 56 there is exposed surface 66. This surface has a C shape when viewed in plan, which shape accommodates in its central portion dome-shaped enlargement 56 and has between the two arcuate and extending portions of the C-shape pouring spout E. As adjoining turning surface 32, surface 66 slopes arcuately upward at an angle of approximately 45 degrees into the vicinity of turning surface 32 along convex slop 76; as adjoined to parabolic boundaries 68, surface 66 slopes upwardly to the ridge defined by this boundary along convex boundaries 77.

Pouring spout E permits the contents of container A to be poured therethrough when the spout is registered with a complementary aperture F in cover C. Regarding complementary aperture F, this aperture has an elliptical periphery 78 which periphery has a major axis 80. Similar to axis 60 of elliptical boundary 58, axis 80 of elliptical periphery 78 extends from the rotational center of cover C radially outward towards flange edge 39. Periphery 78 is adjacent to dome-shaped enlargement 54 at its inward vertex 82 and adjoins the outward periphery of the cover at its outward vertex 84. Complementary aperture F is configured so that when major axis 60 of elliptical periphery 58 immediately overlies major axis 80 of elliptical periphery 78, complementary aperture F underlies and is coextensive with periphery 58 of three-dimensional pouring spout E.

Complementary aperture F must be provided on the inside surface of cover C with a slope whereby the contents of container A may flow to the outward vertex 84 of aperture F. Accordingly, cover C is provided with an inside tapering skirt surface 86 which surface interconnects the inside container surface 19 in a tapering relation to the outside vertex 84 of complementary aperture F. This inside skirt surface 84 extends symmetrically around the entire inside diameter of cover C.

Having described the functional configuration of the cover C and top D, the operation of these respective parts can be set forth. When sealing of the container A is desired, top D is rotated about cover C so as to move three-dimensional pouring spout E to a position on surface 38 wherein the spout is out of registry with complementary aperture F. As out of registry with aperture F, spout E is sealed thereacross by surface 38 from the contents of container A. Similarly, complementary aperture F is sealed by lower surface 49 of top D so as to confine the contents of container A therein.

When access to the contents of container A is desired, top D is rotated to register three-dimensional pouring spout E with complementary aperture F. In this position of registry, the alignment of the respective apertures produces a path whereby the contents of container A may be poured therefrom. Simultaneously, the surfaces of three-dimensional pouring spout E guide the contents of the container A so as to pour therefrom in a single and unitary stream.

In the event that container A has small granular particles, and such particles are desired to be shaken therefrom through a plurality of small apertures, cover C may be provided with a plurality of shaker apertures 99. Shaker apertures 99 when placed within an elliptical boundary similar to periphery 78 of cover C provide a means whereby the three-dimensional pouring spout may be registered therewith and the container utilized as a particle shaking apparatus. As being so utilized, the pouring spout E serves to prevent over-dispersion of the particles in a manner similar to the function of its registry with complementary aperture F.

Although the foregoing invention has been described in some detail by way of illustration and example for purposes of clarity of understanding, it is understood that certain changes and modifications may be practiced within the spirit of the invention.

What is claimed:

1. A dispensing container for granular materials comprising: a cylindrical container body of constant circular cross section closed at one end and having an opening circumscribed by a rim at the other end; a cover fixedly mounted over the open end of said cylindrical container body; a circular disk shaped top mounted in coaxial alignment with said cover and being rotatable thereon, said top having a turning surface substantially coincident with the rim of said container and continuing upwardly from said container rim to form a continuation of the outside cylindrical surface of said container body; said top formed with a concavity on the side facing outwardly from the interior of said container, the wall of said concavity diverging upwardly to said turning surface at the boundaries thereof; an aperture defined in said top at distance spaced from the center point of said top with one portion of said aperture adjacent the periphery of top at said turning surface; a wall section formed integrally of said top and surrounding said aperture adjoining said turning surface whereby said wall forms a three-dimensional pouring spout for guiding granular particles from said container; said wall section contained within said concavity below the boundaries thereof; said cover formed with an aperture coincident with the aperture formed in said top at one position of rotary movement of said top, whereby the aperture of said top and cover can be registered for dispensing granular contents from the interior of said container.

2. The invention of claim 1 and wherein: said aperture in said top and said aperture in said cover are elliptical and coextensive with the major axis of said elliptical apertures extending radially of the axis of relative rotation between said top and cover.

3. The invention of claim 1 and wherein: said wall section, as surrounding said aperture, has a parabolic shaped ridge with the vertex of said parabola adjoining the periphery of said top and said wall sloped relative to the plane of said top and increasing from substantially a 45° slope relative to the plane of said top between the vertexes of said ellipse and parabolic ridge adjoining said turning surface to a slope of increased angle relative to the plane of said top between said parabolic wall and the minor axis of said elliptical aperture.

4. The invention of claim 3 and wherein: said parabolic ridge slopes inwardly towards the bottom surface of said concavity from the ridge of said turning surface about the periphery of said top.

References Cited

UNITED STATES PATENTS

| | | | |
|---|---|---|---|
| 887,760 | 5/1908 | Blood | 222—480 X |
| 2,104,438 | 1/1938 | Richeson | 222—548 X |
| 3,093,272 | 6/1963 | Esthus | 222—480 |
| 3,104,039 | 9/1963 | Dike | 222—536 |
| 3,239,111 | 3/1966 | La Croce | 222—480 |

FOREIGN PATENTS

| | | |
|---|---|---|
| 257,468 | 2/1965 | Australia. |
| 1,327,182 | 4/1963 | France. |
| 1,041,944 | 9/1966 | Great Britain. |

SAMUEL F. COLEMAN, Primary Examiner

U.S. Cl. X.R.

222—548